United States Patent [19]

Hanaoka et al.

[11] Patent Number: 4,904,721
[45] Date of Patent: Feb. 27, 1990

[54] ORGANOALKOXYSILANE-CONTAINING COATING COMPOSITION

[75] Inventors: Hideyuki Hanaoka, Yokkaichi; Kazuo Yamamoto, Mie; Toshiyuki Suzuki, Yokkaichi, all of Japan

[73] Assignee: Japan Synthetic Rubber Co., Ltd., Tokyo, Japan

[21] Appl. No.: 140,998

[22] Filed: Jan. 5, 1988

[30] Foreign Application Priority Data

Jan. 6, 1987 [JP] Japan .................. 62-209

[51] Int. Cl.$^4$ ............................................. C08K 5/24
[52] U.S. Cl. ........................... 524/266; 524/108; 524/113; 524/265; 524/315; 524/361; 524/376; 524/377; 524/378; 524/379; 524/386; 524/388; 524/430
[58] Field of Search ............... 524/265, 266, 430, 108, 524/113, 315, 361, 376, 377, 378, 379, 386, 388

[56] References Cited

U.S. PATENT DOCUMENTS

| | | | |
|---|---|---|---|
| 3,983,265 | 9/1976 | Letoffe | 524/266 |
| 4,157,321 | 6/1979 | Kawakami et al. | 524/266 |
| 4,311,737 | 1/1982 | Ishizaka et al. | 524/188 |
| 4,451,602 | 5/1984 | Kurukawa et al. | 524/266 |
| 4,537,944 | 8/1985 | Imai et al. | 524/265 |

FOREIGN PATENT DOCUMENTS 0093033  6/1983  Japan .................. 524/266

Primary Examiner—Joseph L. Schofer
Assistant Examiner—J. M. Reddick
Attorney, Agent, or Firm—Oblon, Spivak, McClelland, Maier & Neustadt

[57] ABSTRACT

A coating composition comprising:
(a) 100 parts by weight (in terms of organoalkoxysilane) of at least one compound selected from the group consisting of (a') an organoalkoxysilane represented by the general formula (I):

$$RSi(OR^1)_3 \qquad (I)$$

wherein R is an organic group having 1–8 carbon atoms and $R^1$ is an alkyl group having 1–5 carbon atoms or an acyl group having 1–4 carbon atoms, (a'') a hydrolyzate of (a') and (a''') a partial condensate of (a'),
(b) 5–50 parts by weight (as solids) of colloidal alumina, and
($c_1$) 2–200 parts by weight of at least one organopolysiloxane having at least one reactive functional group in the polymer molecule and/or
($c_2$) 3–6,000 parts by weight of at least one silyl group-containing vinyl polymer having, at the terminal(s) or side chain(s) of the polymer molecule, at least one silyl group having a silicon atom having bonded thereto a hydrolyzable group, and
(d) an organic solvent. Said coating composition is excellent in storage stability, can be used at low temperatures and can form a coating film superior in heat resistance, water resistance, boiling water resistance, organic chemical resistance, acid resistance, alkali resistance, corrosion resistance, absorbability and radiatability of heat and light, friction resistance, weather resistance, moisture resistance, salt water resistance, adhesion, hardness and smoothness.

15 Claims, No Drawings

ORGANOALKOXYSILANE-CONTAINING COATING COMPOSITION

This invention relates to a coating composition. More particularly, this invention relates to a coating composition comprising at least one compound selected from the group consisting of an organoalkoxysilane, a hydrolyzate of the organoalkoxysilane and a partial condensate of the organoalkoxysilane; colloidal alumina; an organopolysiloxane and/or a silyl group-containing vinyl resin and an organic solvent.

In recent years, there has been required such a coating composition that has an excellent storage stability, can be hardened at low temperatures and can form a coating film superior in heat resistance, water resistance, boiling water resistance, organic chemical resistance, acid resistance, alkali resistance, corrosion resistance, absorbability and radiatability of heat and light, friction resistance, weather resistance, moisture resistance, salt water resistance, adhesion, hardness and smoothness.

A coating composition satisfying only some of the above requirements is proposed in U.S. Pat. No. 3,986,997 and U.S. Pat. No. 4,027,073, which is an aqueous acidic composition comprising a partial condensate of a silanol and colloidal silica.

The coating compositions described in U.S. Pat. No. 3,986,997 and U.S. Pat. No. 4,027,073, however, are disadvantageous in that the condensation of the trisilanol contained therein does not proceed sufficiently during the aging of the composition at ordinary temperature and that the coating film formed from the composition has an insufficient adhesion to substrates and has a poor alkali resistance.

The present inventors have made research on the above technical problems and, as a result, have found a coating composition which has an excellent stability, can be hardened at low temperatures and can form a coating film superior in heat resistance, water resistance, boiling water resistance, organic chemical resistance, acid resistance, alkali resistance, corrosion resistance, absorbability and radiatability of heat and light, friction resistance, weather resistance, moisture resistance, salt water resistance, adhesion, hardness and smoothness.

According to this invention, there is provided a coating composition comprising:

(a) 100 parts by weight (in terms of organoalkoxysilane) of at least one compound selected from the group consisting of an organoalkoxysilane represented by the general formula (I):

$$RSi(OR^1)_3 \qquad (I)$$

wherein R is an organic group of 1-8 carbon atoms and $R^1$ is an alkyl group of 1-5 carbon atoms or an acyl group of 1-4 carbon atoms; a hydrolyzate of said organoalkoxysilane; and a partial condensate thereof [the organoalkoxysilane, the hydrolyzate and the partial condensate are hereinafter referred to as the component (a)], (b) 5-50 parts by weight (as solids) of colloidal alumina [hereinafter referred to as the colloidal alumina (b)], and (c₁) 2-200 parts by weight of an organopolysiloxane having at least one reactive functional group in the polymer molecule [hereinafter referred to as the organopolysiloxane (c)] and/or (c₂) 3-6,000 parts by weight of a silyl group-containing vinyl resin having, at the terminal(s) or side chain(s) of the polymer molecule, at least one silyl group having a silicon atom bonded to a hydrolyzable group [the resin being hereinafter referred to as the silyl group-containing vinyl resin (d)], and (d) an organic solvent.

Each of the essential constituents of the composition of this invention will be described in detail below.

Component (a)

The component (a) is at least one compound selected from the group consisting of (a') an organoalkoxysilane represented by the general formula (I), (a") a hydrolyzate of the organoalkoxysilane and (a''') a partial condensate thereof and acts as a binder in the composition of this invention.

R in the formula (I) for the organoalkoxysilane (a') is an organic group having 1-8 carbon atoms and includes, for example, alkyl groups (e.g. methyl, ethyl, propyl and the like), gamma-chloropropyl group, vinyl group, 3,3,3-trifluoropropyl group, gamma-glycidoxypropyl group, gamma-methacryloyloxypropyl group, gamma-mercaptopropyl group, phenyl group, 3,4-epoxycyclohexylethyl group, etc.

$R^1$ in the formula (I) for the organoalkoxysilane (a') is an alkyl group having 1-5 carbon atoms or an acyl group having 1-4 carbon atoms and includes, for example, methyl group, ethyl group, propyl group, butyl group, formyl group and acetyl group.

Specific examples of the organoalkoxysilane (a') include methyltrimethoxysilane, methyltriethoxysilane, methyltriacetoxysilane, methyltripropionyloxysilane, ethyltrimethoxysilane, ethyltriethoxysilane, propyltrimethoxysilane, propyltriethoxysilane, gamma-chloropropyltrimethoxysilane, gamma-chloropropyltriethoxysilane, vinyltrimethoxysilane, vinyltriethoxysilane, 3,3,3-trifluoropropyltrimethoxysilane, 3,3,3-trifluoropropyltriethoxysilane, gamma-glycidoxypropyltrimethoxysilane, gamma-glycidoxypropyltriethoxysilane, gamma-methacryloyloxypropyltrimethoxysilane, gamma-methacryloyloxypropyltriethoxysilane, gamma-mercaptopropyltrimethoxysilane, gamma-mercaptopropyltriethoxysilane, phenyltrimethoxysilane, phenyltriethoxysilane, 3,4-epoxycyclohexylethyltrimethoxysilane and 3,4-epoxycyclohexylethyltriethoxysilane. Of these, preferred are methyltrimethoxysilane and methyltriethoxysilane.

These organoalkoxysilanes (a') can be used alone or in combination of two or more.

It is preferable that the organoalkoxysilane (a') represented by the general formula (I) contains at least 80 mole % of $CH_3Si(OR^1)_3$.

Preferably, the component (a) is a partial condensate (a''') of the organoalkoxysilane. The partial condensate has a polystyrene-reduced weight average molecular weight of preferably 500-50,000, more preferably 3,000-20,000. When the molecular weight is less than 500, the resulting composition gives a coating film of poor adhesion. When the molecular weight is more than 50,000, the resulting composition has a reduced storage stability, in some cases.

Colloidal alumina (b)

The colloidal alumina (b) is used for the purpose of preventing the gelation and thickening of the composition of this invention, dispersing the optionally used fillers, enhancing the heat resistance, hardness and adhesion of the coating film formed by coating a substrate with the filler-containing composition, and imparting antistatic property.

The colloidal alumina (b) is usually an alumina sol having a pH of 2.5–6 in which water is a dispersing medium, contains about 5–25% by weight in total of alumina, quasi-boehmite and boehmite and also and acid (e.g. nitric acid, hydrochloric acid, acetic acid or the like) as a stabilizer, and has an average particle diameter of 5–200 mμ, preferably 10–100 mμ. The alumina sol includes, for example, ALUMINUMSOL-100, ALUMINUMSOL-200 and ALUMINUMSOL-520 (products of Nissan Chemical Industries, Ltd.).

The colloidal alumina (b) may also be those obtained by hydrolysis of anhydrous aluminum chloride or hydrolysis of an aluminum alkoxide represented by the general formula (II):

$$Al(OR^2)_3 \quad (II)$$

wherein $R^2$ is an alkyl group having 1–4 carbon atoms such as methyl, ethyl, n-butyl or the like, for example, a colloidal alumina consisting of 5–25% by weight of finely divided alumina having an average particle diameter of 5–200 mμ, preferably 10–100 mμ, 75–95% by weight of water and 0.05–5% by weight of an acid such as acetic acid, hydrochloric acid or the like.

The colloidal alumina (b) may be an aqueous acidic dispersion (pH 2–6) of fine alumina particles having an average particle diameter of 5–200 mμ, preferably 10–100 mμ.

The fine alumina particles include, for example, Aluminum Oxide C (a product of Degusa Co., Germany).

The proportion of the colloidal alumina (b) in the present composition is 5–50 parts by weight, preferably 8–40 parts by weight, as solids per 100 parts by weight (in terms of organoalkoxysilane) of the component (a). When the proportion is less than 5 parts by weight, it is not sufficient to prevent the composition of this invention from gelling, being thickened and forming a thick coating film; the dispersion of the optionally used fillers in the composition is not sufficient; and the coating film formed from the composition has no sufficient hardness and tends to be cracked. When the proportion is more than 50 parts by weight, the proportions of the other components in the composition inevitably are relatively lessened to cause excessive thickening of the composition and reduction of intimate adhesion of the coating film formed from the composition.

Organopolysiloxane ($c_1$)

The organopolysiloxane ($c_1$) is an organopolysiloxane having at least one reactive functional group in the molecule.

The organopolysiloxane ($c_1$) is, for example, an organopolysiloxane having a unit structure represented by the general formula (III):

$$R^3{}_a SiO_{(4-a)/2} \quad (III)$$

wherein $R^3$ is an organic group having 1–8 carbon atoms and a is a positive number of 1.1–1.8, and having, in the molecule, at least one reactive functional group represented by —OX′ (X′ is a hydrogen atom or an alkyl group having 1–5 carbon atoms) bonded to the silicon atom.

$R^3$ in the general formula (III) is an organic group and includes, for example, alkyl groups (e.g. methyl, ethyl, propyl and the like), gamma-chloropropyl group, vinyl group, 3,3,3-trifluoropropyl group, gamma-glycidoxypropyl group, gamma-methacryloyloxypropyl group, gamma-mercaptopropyl group, phenyl group, 3,4-epoxycyclohexylethyl group and gamma-aminopropyl group. Of these groups, preferred are methyl and phenyl groups.

In the general formula (III), a is a positive number of 1.1–1.8, preferably 1.2–1.6. When a is less than 1.1, the coating film formed from the resulting composition is cracked in some cases. When a is more than 1.8, the coating film is difficult to harden in some cases.

The organopolysiloxane ($c_1$) has, in the molecule, at least one, preferably 3–30 reactive functional groups (e.g. —OX′ group) bonded to the silicon atoms of the organopolysiloxane.

X′ of the —OX′ group is a hydrogen atom or an alkyl group having 1–5 carbon atoms such as methyl, ethyl, propyl, butyl or the like.

If the organopolysiloxane ($c_1$) has no reactive functional group in the molecule, the hardening reaction of the resulting composition does not proceed sufficiently.

Specific examples of the organopolysiloxane ($c_1$) include silicone resins such as Silicone Varnishes TSR 160, TSR 145, TSR 127B, TSR 165, YR 3187 and YR 3168 (these are products of TOSHIBA SILICONE K.K.); Silicone Varnishes SH 6018 and Q 1-37 (these are products of TORAY SILICONE K.K.); Silicone Intermediates KR 211, KR 212, KR 213, KR 214, KR 216 and KR 218 (these are products of Shin-Etsu Chemical Co., Ltd.); and Intermediates SY 409 and SY 430 (these are products of Wacker Chemicals Co.).

The proportion of the organopolysiloxane ($c_1$) in the present composition is 2–200 parts by weight, preferably 5–50 parts by weight per 100 parts by weight of the component (a) (in terms of organoalkoxysilane). When the proportion is less than 2 parts by weight, the water resistance and alkali resistance of the coating film are reduced. When the proportion is more than 200 parts by weight, the hardness and solvent resistance are reduced.

The organopolysiloxanes ($c_1$) can be used alone or in admixture of two or more.

Silyl group-containing vinyl resin ($c_2$)

The silyl group-containing vinyl resin (d) has the main chain consisting of a vinyl polymer and, at the terminal(s) or side chain(s) of the polymer molecule, at least one, preferably at least two silyl groups each having a silicon atom having bounded thereto a hydrolyzable group. Many of said silyl groups are represented by the general formula (IV):

$$\underset{|}{-Si}\!-\!X_n \overset{(R^4)_{3-n}}{} \quad (IV)$$

wherein X is a hydrolyzable group such as halogen atom, hydroxyl group, alkoxy group, acyloxy group, phenoxy group, thioalkoxy group, amino group or the like, $R^4$ is a hydrogen atom, an alkyl group having 1–10 carbon atoms or an aralkyl group having 7–10 carbon atoms, and n is an integer of 1–3. Specific examples of X are halogen atoms such as chlorine atom, bromine atom and the like; alkoxy groups such as methoxy, ethoxy, propoxy and the like; acyloxy groups such as acetyl, propionyl and the like; and thioalkoxy groups such as methylmercapto, ethylmercapto and the like. Specific examples of $R^4$ are alkyl groups having 1–10 carbon atoms such as methyl, ethyl, propyl, octyl, nonyl and the like; and aralkyl groups having 7-10 carbon atoms such as benzyl, phenethyl, cumyl and the like.

The silyl group-containing vinyl resin (c₂) can be produced by (i) reacting a hydrosilane compound with a vinyl resin having carbon to carbon double bonds or by (ii) polymerizing a vinyl compound with a silane compound represented by the general formula (V):

$$R^5-\underset{\underset{X_n}{|}}{Si}-(R^4)_{3-n} \quad (V)$$

wherein X, $R^4$ and n have the same meanings as defined above, and $R^5$ is an organic group having a polymerizable double bond such as $CH_2=CH-$, $CH_2=CHCOO(CH_2)_3-$, $CH_2=C(CH_3)COO(CH_2)_3-$ or

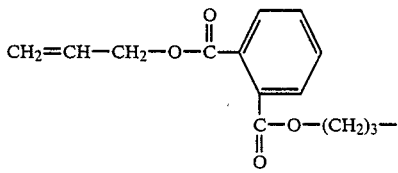

or the like.

The hydrosilane compound used in the production method (i) includes, for example, halogenated silanes such as methyldichlorosilane, trichlorosilane, phenyldichlorosilane and the like; alkoxysilanes such as methyldiethoxysilane, methyldimethoxysilane, phenyldimethoxysilane, trimethoxysilane, triethoxysilane and the like; and acyloxysilanes such as methyldiacetoxysilane, phenyldiacetoxysilane, triacetoxysilane and the like.

The vinyl resin used in the production method (i) may be any other vinyl resin than hydroxyl group-containing vinyl resins. Suitable as the vinyl resin are polymers of vinyl compounds selected from (meth)acrylic acid esters such as methyl (meth)acrylate, ethyl (meth)acrylate, butyl (meth)acrylate, 2-ethylhexyl (meth)acrylate and the like; carboxylic acids such as (meth)acrylic acid, itaconic acid, fumaric acid and the like; acid anhydrides such as maleic anhydride and the like; epoxy compounds such as glycidyl (meth)acrylate and the like; amino compounds such as diethylaminoethyl (meth)acrylate, aminoethyl vinyl ether and the like; amide compounds such as (meth)acrylamide, itaconic acid diamide, alpha-ethylacrylamide, crotonic acid amide, fumaric acid diamide, maleic acid diamide, N-butoxymethyl(meth)acrylamide and the like; acrylonitrile; styrene; alpha-methylstyrene; vinyl chloride; vinyl acetate; vinyl propionate; and so forth.

In the production of a polymer of such a vinyl compound, it is possible to introduce carbon to carbon double bonds necessary for hydrosilylation into the vinyl resin by copolymerizing allyl acrylate, allyl methacrylate, diallyl phthalate or the like.

The silane compound used in the production method (ii) includes, for example, $$CH_2=CHSi(OCH_3)_2, \quad CH_2=CHSi(OCH_3)_3,$$
$$\overset{CH_3}{|}$$

$$CH_2=CHSiCl_2, \quad CH_2=CHSiCl_3,$$
$$\overset{CH_3}{|}$$

-continued $$CH_2=CHCOO(CH_2)_3Si(OCH_3)_2,$$
$$\overset{CH_3}{|}$$

$$CH_2=CHCOO(CH_2)_3Si(OCH_3)_3,$$

$$CH_2=CHCOO(CH_2)_3SiCl_2, \quad CH_2=CHCOO(CH_2)_3SiCl_3,$$
$$\overset{CH_3}{|}$$

$$CH_2=C(CH_3)COO(CH_2)_3Si(OCH_3)_2,$$
$$\overset{CH_3}{|}$$

$$CH_2=C(CH_3)COO(CH_2)_3Si(OCH_3)_3,$$

$$CH_2=C(CH_3)COO(CH_2)_3SiCl_2,$$
$$\overset{CH_3}{|}$$

$$CH_2=C(CH_3)COO(CH_2)_3SiCl_3,$$

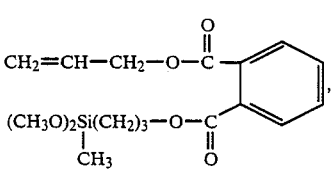

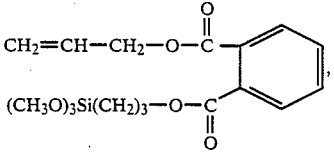

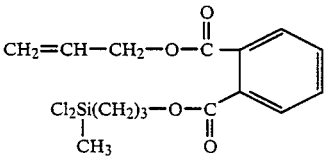

and

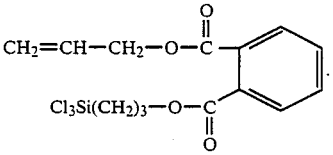

As the vinyl compound used in the production method (ii), it is possible to employ the vinyl compounds which are used in the polymerization in the production method (i). In addition thereto, there can also be used hydroxyl-group containing vinyl compounds such as 2-hydroxyethyl (meth)acrylate, 2-hydroxypropyl (meth)acrylate, 2-hydroxypropylvinyl ether, N-methylolacrylamide and the like.

Specific examples of the silyl group-containing vinyl resin (d) are KANEKA GEMLAK ® and KANEKA SILYL ® (products of Kanegafuchi Chemical Industry Co., Ltd.), Silicone Acryl Varnish TSR 171 (a product of TOSHIBA SILICONE K.K.) and the like.

The proportion of the silyl group-containing vinyl resin (c₂) in the present composition is 3-6,000 parts by weight, preferably 10-3,000 parts by weight, more preferably 10-2,000 parts by weight, most preferably 10-200 parts by weight, per 100 parts by weight of the component (a) (in terms of organoalkoxysilane). When the proportion is less than 3 parts by weight, the alkali resistance of the coating film formed is low. When the proportion is more than 6,000 parts by weight, the weather resistance and hardness of the coating film formed is reduced.

The silyl group-containing vinyl resin (d) can be used alone or in admixture of two or more.

(d) Organic solvent

The composition of this invention can be prepared by uniformly mixing and dispersing essential components (a) and (b) and components ($c_1$) and/or (d) and (e) an organic solvent to control the concentrations of the components (a) to (d), make the composition applicable to various coating methods, and enhance the dispersion stability and storage stability of the composition.

The organic solvent (d) includes hydrophilic organic solvents, which may be present in the colloidal alumina (b) in the case where a hydrophilic organic solvent is contained as a dispersing medium for the component (b).

The organic solvent (d) is not critical and may be any solvents as long as the components (a) to (d) can uniformly dispersed therein, but an alcohol, an aromatic hydrocarbon, an ether, a ketone, an ester or the like may be appropriately used.

Specific examples of the alcohol include methyl alcohol, ethyl alcohol, n-propyl alcohol, isopropyl alcohol, n-butyl alcohol, isobutyl alcohol, sec-butyl alcohol, tertbutyl alcohol, ethylene glycol, diethylene glycol, triethylene glycol, ethylene glycol monobutyl ether, ethylene glycol monoethyl ether, ethylene glycol monomethyl ether and the like.

Specific examples of the aromatic hydrocarbon include benzene, toluene, xylene and the like.

Specific examples of the ether include tetrahydrofuran, dioxane, ethylene glycol monoethyl ether acetate, and the like.

Specific examples of the ketone include acetone, methyl ethyl ketone, methyl isobutyl ketone, diisobutyl ketone and the like.

Specific examples of the ester include ethyl acetate, propyl acetate, butyl acetate, propylene carbonate and the like.

These organic solvents can be used alone or in admixture of two or more.

The composition of this invention comprising the components (a) to (d) has a total solids content of preferably 10-50% by weight, particularly preferably 15-35% by weight. When the solids content is less than 10% by weight, the concentration is too low and the coating film formed from the resulting composition do not exhibit heat resistance, water resistance, chemical resistance, weather resistance, etc. in some cases and there are cases where pin holes appear in the film. When the solids content is more than 50% by weight, the concentration is too high and there are cases where the resulting composition has a poor storage stability and it becomes difficult to form a uniform coating film by coating the composition on a substrate.

The composition may further comprise fillers if necessary. The fillers are water-insoluble fillers and include, for example, organic and inorganic pigments. Besides, there can also be used metals, alloys, and their oxides, hydroxides, carbonates, nitrides, sulfides, etc. in the form of particles or fibers. Specific examples thereof include iron, copper, aluminum, nickel, silver, zinc, lead, chromium, ferrite, carbon black, stainless steel, silicon dioxide, titanium oxide, aluminum oxide, chromium oxide, manganese oxide, iron oxide, zirconium oxide, cobalt oxide, tin oxide, copper oxide, synthetic mullite, zircon (zirconia silicate), aluminum hydroxide, iron hydroxide, silicon carbide, silicon nitride, boron nitride and molybdenum disulfide in the form of particles or fibers. The fillers are not limited thereto.

These fillers have usually an average particle diameter or average length of 0.05-50 $\mu$m, preferably 0.1-5 $\mu$m. When the average particle diameter or average length is less than 0.05 $\mu$m, the viscosity of the composition is increased and the desired film thickness cannot be achieved in some cases. When the average particle diameter or average length is more than 50 $\mu$m, the resulting composition tends to have a poor dispersibility.

The proportion of the fillers optionally used in the present composition is usually 50-500 parts by weight, preferably 80-300 parts by weight, per 100 parts by weight of the component (a) (in terms of organoalkoxysilane). When the proportion is less than 50 parts by weight, the fillers cannot impart the desired properties sufficiently to the present composition. When the proportion is more than 500 parts by weight, the resulting composition gels in some cases and, as a result, the coating film formed from the composition has a deteriorated hardness, a deteriorated adhesion to substrates and a low work efficiency.

For faster hardening the present composition, a hardening accelerator may be used under some hardening conditions. Co-use of hardening accelerators is effective for conducting the hardening at relatively low temperatures.

The hardening accelerator includes, for example, alkaline compounds such as sodium hydroxide, potassium hydroxide and the like; acidic compounds such as alkyl titanate, phosphoric acid, p-toluenesulfonic acid, phthalic acid and the like; amine compounds such as ethylenediamine, hexanediamine, diethylenetriamine, triethylenetetramine, tetraethylenepentamine, piperidine, piperazine, meta-phenylenediamine, ethanolamine, triethylamine, various modified amines used as a hardening agent for epoxy resins and the like; amine type silane coupling agents such as gamma-aminopropyltriethoxysilane, gamma-(2-aminoethyl)aminopropyltriethoxysilane, gamma-(2-aminoethyl)aminopropylmethyldimethoxysilane, gamma-anilinopropyltrimethoxysilane and the like; and organotin compounds, for example, $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $(C_4H_9)_2Sn(SCH_2COO)$, $(C_4H_9)_2Sn(SCH_2COOC_8H_{17})_2$, $(C_8H_{17})_2Sn(SCH_2COO)$, $(C_8H_{17})_2Sn(SCH_2CH_2COO)$, $(C_8H_{17})_2Sn(SCH_2COOCH_2CH_2OCOCH_2S)$, $(C_8H_{17})_2Sn(SCH_2COOCH_2—CH_2CH_2CH_2OCOCH_2S)$, $(C_8H_{17})_2Sn(SCH_2COOC_8H_{17})_2$, $(C_8H_{17})_2Sn(SCH_2COOC_{12}H_{25})_2$,

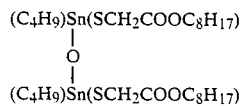

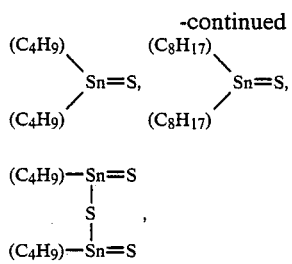

reaction products between (1) an organotin oxide such as $(C_4H_9)_2SnO$, $(C_8H_{17})_2SnO$, $(C_4H_9)SnO$, $(C_8H_{17})SnO$ or the like and (2) an ester compound such as ethyl silicate, ethyl silicate 40 [partial condensate of $Si(OEt)_4$ (orthoethyl silicate; common name, ethyl silicate 28)], dimethyl maleate, diethyl maleate, dioctyl phthalate or the like.

The proportion of the hardening accelerator in the composition of this invention is usually not more than 15 parts by weight, preferably 0.01–10 parts by weight, per 100 parts by weight of the present composition.

The present composition can further comprise other conventionally known additives such as surfactants, other silane coupling agents than those mentioned above; titanium coupling agents; alkali metal salts of naphthenic acid, octylic acid, nitrous acid, sulfurous acid, aluminum hydroxide trihydrate, carbonic acid and the like; dyes; and the like.

The composition of this invention can be coated on the surface of an object substrate by a coating means such as brushing, spraying, dipping or the like, in a film thickness of about 5–50 μm in the case of single coating and of about 10–150 μm in the case of double or triple coating. The film is heated for about 10 minutes to 12 hours at temperatures of from room temperature to about 300° C. to obtain a dry and hard coating film.

The substrate to which the present composition can be applied includes, for example, stainless steel, aluminum, ceramics, concrete, paper, glass, plastics and the like.

This invention will be explained in more detail below referring to Examples. However, this invention should not be interpreted to be restricted to these Examples.

In the Examples, part and % are by weight unless otherwise specified.

Also in the Examples, the determination of polystyrene-reduced weight average molecular weight by gel permeation chromatography (GPC) and measurements of other properties were conducted as follows:

Weight average molecular weight by GPC

Under the following conditions, a solution of 1 g of an organopolysiloxane in 100 cc of tetrahydrofuran was used as a sample, and as the standard polystyrene, there was used a standard polystyrene manufactured by Pressure Chemical Co., U.S.A.:

Apparatus: Model 150-C ALC/GPC, a high-temperature, high-speed gel permeation chromatograph manufactured by Waters Co., U.S.A.

Column: SHODEX A-80M (length: 50 cm) manufactured by Showa Denko K.K.

Measurement temperature: 40° C.,

Flow rate: 1 cc/min,

Adhesion

According to the crosscut adhesive test specified by JIS K5400, tape peeling was conducted three times and an average of the resulting three values was used as the adhesion.

Hardness

Measured according to the pencil hardness test specified by JIS K 5400.

Weather resistance

The 2,000-hour irradiation test specified by JIS K 5400 was conducted using a weatherometer, and the condition of the coating film after the test was observed.

Temperature cycle test

A temperature cycle consisting of heating for 30 min at 200° C. and cooling for 30 min at −20° C. was repeated 100 times, and the condition of the coating film after the test was observed.

Storage stability

A sample containing no hardening accelerator was stored in a tightly stoppered polyethylene bottle and the occurrence of gelation in the sample was examined visually. When the sample caused no gelation, the sample after storage was measured for viscosity in accordance with JIS K 5400 and, when the viscosity change was 10% or less, the storage stability of the sample was indicated as "no change".

Pot life

A sample containing a hardening accelerator was stored in a tightly stoppered polyethylene bottle and the occurrence of gelation in the sample was examined visually.

Water resistance

A test piece having a coating film thereon was immersed in tap water for 60 days at room temperature and the condition of the coating film after the immersion was observed.

Boiling water resistance

A test piece having a coating film thereon was placed in boiling tap water for 16 hours and the condition of the coating film after the treatment was observed.

Acid resistance 1 ml of 20% sulfuric acid was dropped on a coating film formed on a test piece. The test piece was then allowed to stand for 1 day in a laboratory dish with a lid and water-rinsed, after which the condiction of the coating film was observed.

Alkali resistance (1)

1 ml of a 3% aqueous sodium hydroxide solution was dropped on a coating film formed on a test piece. The test piece was then allowed to stand for 1 day in a laboratory dish with a lid and water-rinsed, after which the condition of the coating film was observed.

Alkali resistance (2)

A test piece having a coating film thereon was immersed in a saturated aqueous slaked lime solution for 30 days and water-rinsed, after which the condition of the coating film was observed.

Reference Example 1

In a reactor equipped with a reflux condenser and a stirrer were placed (a') 100 parts of methyltrimethoxysilane, (b) 50 parts of Alumina Sol 520 (an aqueous dispersion of alumina having a solids content of 20%, manufactured by Nissan Chemical Industries, Ltd.) and (d) 15 parts of isopropyl alcohol. They were subjected to reaction for 4 hours at 60° C., after which (d) 100 parts of isopropyl alcohol (hereinafter referred to simply as "additional isopropyl alcohol") was further added to obtain an inorganic binder (1).

The thus obtained composition was subjected to centrifugation to remove the alumina portion. The resulting supernatant was filtered through a filter having a pore diameter of 0.45 μm. The resulting filtrate was subjected to GPC, whereby the partial condensate (a''') was found to have a polystyrene-reduced weight average molecular weight of 7,300.

The above procedure was repeated, except that the types and amounts of the organoalkoxysilane (a') and the colloidal alumina (b) and the reaction temperature were varied as shown in Table 1, to obtain inorganic binders (2) to (6). The inorganic binders (1) to (6) were used in Examples and Comparative Examples.

EXAMPLE 1

To each of the inorganic binders (1) to (6) obtained in Reference Example 1 and shown in Table 1 were added (c1) an organopolysiloxane and/or (c2) a silyl group-containing vinyl resin and (e) a solvent as shown in Table 2, whereby coating compositions A to Q shown in Table 2 were obtained.

Comparative Example 1

Coating compositions R to V shown in Table 2 were obtained in the same manner as in Example 1.

Test Example 1

The compositions A to Q obtained in Example 1 and all of the compositions R to V obtained in Comparative Example 1 with or without hardening accelerators shown in Table 3 were coated on the following test pieces (1) and (2) using an air spray gun and hardened at a temperature of from room temperature to 150° C. to form coating films:

Test piece (1): An asbestos sheet (JIS A 5403)
Test piece (2): An aluminum plate (JIS H 4000, A1050P)

Each of the above coating films was measured for adhesion, hardness, weather resistance, temperature cycle test, alkali resistance, storage stability and pot life. The results are shown in Table 3.

EXAMPLE 2

Each of the coating compositions A to Q shown in Table 2 was used as a binder, and fillers shown in Table 4 were added to each binder. They were mixed for 5 hours using a ball mill, whereby coating compositions a to q shown in Table 4 were obtained.

Comparative Example 2

Coating compositions r to v shown in Table 4 were obtained in the same manner as in Example 2.

Test Example 2

The compositions a to q obtained in Example 2 and all of the compositions r to v obtained in Comparative Example 2 with or without hardening accelerators shown in Table 5 were coated on the previously mentioned test pieces (1) and (2) using an air spray gun and hardened at room temperature to 150° C. to form coating films. Each of the above coating films was measured for adhesion, hardness, temperature cycle test, boiling water resistance, water resistance, acid resistance, alkali resistance, weather resistance, storage stability and pot file. The results are shown in Table 5.

TABLE 1

| | | Reference Example 1 | | | | | |
|---|---|---|---|---|---|---|---|
| Serial number of inorganic binder | | (1) | (2) | (3) | (4) | (5) | (6) |
| Proportions (parts) of raw materials, reaction conditions | | | | | | | |
| (a') | Methyltrimethoxysilane | 100 | 100 | 90 | — | 100 | 100 |
| (a') | Methyltriethoxysilane | — | — | — | 100 | — | — |
| (a') | Phenyltrimethoxysilane | — | — | 10 | — | — | — |
| (b) | ALUMINUMSOL-100*[1] (solid content: 10%) | — | — | — | 50 | — | — |
| (b) | ALUMINUMSOL-200*[1] (solid content: 10%) | — | — | — | — | 80 | — |
| (b) | ALUMINUMSOL-520*[1] (solid content: 20%) | 50 | 50 | 60 | — | — | 30 |
| (e) | Isopropyl alcohol | 15 | 15 | — | 5 | 10 | 10 |
| (e) | n-Butyl alcohol | — | — | 20 | — | — | — |
| (e) | Additional isopropyl alcohol | 100 | 100 | 80 | 150 | 200 | 100 |
| Reaction temperature (°C.) | | 60 | 80 | 60 | 70 | 80 | 60 |
| Reaction time (hours) | | 4 | 6 | 4 | 6 | 6 | 2 |
| Solid content of inorganic binder (%) | | 22.8 | 22.7 | 23.8 | 18.7 | 15.5 | 32.4 |
| Polystyrene-reduced weight average molecular weight of (a''') a partial condensate of (a') | | 7,300 | 18,500 | 12,500 | 15,000 | 42,500 | 3,740 |

Note:
*[1]Manufactured by Nissan Chemical Industries, Ltd.

TABLE 2

| | Example 1 | | | | | | | | |
|---|---|---|---|---|---|---|---|---|---|
| Symbol of Coating Composition | A | B | C | D | E | F | G | H | I |
| Proportions (parts) of raw materials | | | | | | | | | |
| Inorganic binder (1) | 90 | 80 | 50 | 20 | — | — | — | — | — |
| Inorganic binder (2) | — | — | — | — | 80 | — | — | — | — |
| Inorganic binder (3) | — | — | — | — | — | 80 | — | — | — |
| Inorganic binder (4) | — | — | — | — | — | — | 60 | — | — |
| Inorganic binder (5) | — | — | — | — | — | — | — | 60 | — |
| Inorganic binder (6) | — | — | — | — | — | — | — | — | 80 |
| (c) Organopolysiloxane: Silicone Varnish TSR145*[1] | — | — | — | — | — | — | — | — | — |
| (c) Organopolysiloxane: Silicone Varnish TSR160*[1] | — | — | — | — | — | — | — | — | — |
| (d) Silyl group-containing vinyl resin: KANEKA GEMLAK ®*[2] | 10 | 20 | 50 | 80 | 20 | — | 40 | — | 20 |
| (d) Silyl group-containing vinyl resin: KANEKA SILYL ®*[2] | — | — | — | — | — | 20 | — | 40 | — |
| Toluene | 10 | 20 | 50 | 80 | — | — | 40 | 40 | — |
| Ethylene glycol acetate monobutyl ether | — | — | — | — | 20 | 20 | — | — | 20 |

| Example 1 | Comparative Example 1 |
|---|---|

TABLE 2-continued

| J | K | L | M | N | O | P | Q | R | S | T | U | V |
|---|---|---|---|---|---|---|---|---|---|---|---|---|
| 90 | 80 | 80 | — | — | — | — | — | 99.5 | 99.5 | 2 | 40 | — |
| — | — | — | — | — | — | — | — | — | — | — | — | — |
| — | — | — | 70 | — | — | — | — | — | — | — | — | 35 |
| — | — | — | — | 65 | — | — | — | — | — | — | — | — |
| — | — | — | — | — | 50 | — | — | — | — | — | — | — |
| — | — | — | — | — | — | 70 | 80 | — | — | — | — | — |
| 10 | — | 10 | 30 | — | 10 | — | 15 | 0.5 | — | — | 60 | — |
| — | 20 | — | — | 15 | — | 30 | — | — | — | — | — | 55 |
| 20 | 30 | 10 | — | 20 | 40 | — | 5 | — | 0.5 | 98 | — | 10 |
| — | — | — | — | — | — | — | — | — | — | — | — | — |
| — | — | — | — | 20 | — | — | — | — | 10 | 100 | 10 | — |
| 10 | 10 | 10 | 30 | 10 | 40 | 10 | 10 | 10 | — | — | 50 | 70 |

Note:
[1] Manufactured by TOSHIBA SILICONE K.K.
[2] Manufactured by Kanegafuchi Chemical Industry Co., Ltd.

TABLE 3

| Kind of test piece | | Symbol of composition | Hardening accelerator Type | Amount (part)*1 | Hardening conditions Temp. (°C.) | Time | Adhesion | Hardness | Weather resistance | Temperature cycle test | Storage stability | Pot life | Alkali resistance (1) |
|---|---|---|---|---|---|---|---|---|---|---|---|---|---|
| Example 1 | (1) | A | Gamma-(2-aminoethyl)-amino-propyltrimethoxysilane | 1 | 120 | 10 min | 100/100 | 5H | No change | No change | No change for 6 months | Longer than 24 hr | No change |
| | | C | same as above | 1 | 20 | 12 hr | " | 2H | " | " | No change for 6 months | Longer than 24 hr | " |
| | | E | — | — | 150 | 30 min | " | 4H | " | " | No change for 6 months | Longer than 24 hr | " |
| | | F | — | — | 150 | 30 min | " | 4H | " | " | No change for 6 months | Longer than 24 hr | " |
| | | H | Dibutyltin dilaurate | 2 | 60 | 30 min | " | 3H | " | " | No change for 6 months | Longer than 24 hr | " |
| | | I | same as above | 2 | 20 | 12 hr | " | 3H | " | " | No change for 6 months | Longer than 24 hr | " |
| | | J | Gamma-(2-aminoethyl)-amino-propyltrimethoxysilane | 1 | 120 | 10 min | " | 5H | " | " | No change for 6 months | Longer than 24 hr | " |
| | | K | same as above | 1 | 120 | 10 min | " | 5H | " | " | No change for 6 months | Longer than 24 hr | " |
| | | L | same as above | 1 | 120 | 10 min | " | 5H | " | " | No change for 6 months | Longer than 24 hr | " |
| | | M | same as above | 1 | 120 | 10 min | " | 3H | " | " | No change for 6 months | Longer than 24 hr | " |
| | | N | same as above | 1 | 120 | 10 min | " | 5H | " | " | No change for 6 months | Longer than 24 hr | " |
| | | O | same as above | 1 | 120 | 10 min | " | 4H | " | " | No change for 6 months | Longer than 24 hr | " |
| | | P | Gamma-(2-aminoethyl)-amino-propyltrimethoxysilane | 1 | 120 | 10 min | 100/100 | 5H | No change | No change | No change for 6 months | Longer than 24 hr | No change |
| | | Q | same as above | 1 | 120 | 10 min | " | 5H | " | " | No change for 6 months | Longer than 24 hr | Whitening |
| Comparative Example 1 | | R | same as above | 1 | 120 | 10 min | " | 4H | Peeled | Peeled | No change for 6 months | Longer than 24 hr | " |
| | | S | same as above | 1 | 120 | 10 min | " | 3H | " | " | No change for 6 months | Longer than 24 hr | " |
| | | T | same as above | 1 | 120 | 10 min | 90/100 | HB | " | Cracks appeared | No change for 6 months | Longer than 24 hr | No change |
| | | U | same as above | 1 | 120 | 10 min | 90/100 | B | " | Cracks appeared | No change for 6 months | 5 hr | " |
| | | V | same as above | 1 | 120 | 10 min | 90/100 | 2B | " | Cracks appeared | No change for 6 months | Longer than 24 hr | " |
| Example 1 | (2) | B | Gamma-(2-aminoethyl)-amino-propyltrimethoxysilane | 1 | 100 | 10 min | 100/100 | 5H | No change | No change | No change for 6 months | Longer than 24 hr | No change |
| | | C | same as above | 1 | 20 | 12 hr | " | 2H | " | " | No change for 6 months | Longer than 24 hr | " |
| | | D | Dibutyltin dilaurate | 5 | 100 | 10 min | " | 3H | " | " | No change for 6 months | Longer than 24 hr | " |
| | | F | — | — | 150 | 30 min | " | 4H | " | " | No change for 6 months | Longer than 24 hr | " |
| | | G | — | — | 150 | 30 min | " | 3H | " | " | No change for 6 months | Longer than 24 hr | " |
| | | H | — | — | 150 | 30 min | " | 3H | " | " | No change for 6 months | Longer than 24 hr | " |

TABLE 3-continued

| Kind of test piece | Symbol of composition | Hardening accelerator Type | Amount (part)*1 | Hardening conditions Temp. (°C.) | Time | Adhesion | Hardness | Weather resistance | Temperature cycle test | Storage stability | Pot life | Alkali resistance (I) |
|---|---|---|---|---|---|---|---|---|---|---|---|---|
| | J | Gamma-(2-aminoethyl)-amino-propyltrimethoxysilane | 1 | 150 | 30 min | " | 5H | " | " | No change for 6 months | Longer than 24 hr | " |
| | K | Dibutyltin dilaurate | 5 | 150 | 30 min | " | 5H | " | " | No change for 6 months | Longer than 24 hr | " |
| | L | Gamma-(2-aminoethyl)-amino-propyltrimethoxysilane | 1 | 150 | 30 min | " | 4H | " | " | No change for 6 months | Longer than 24 hr | " |
| | M | same as above | 1 | 150 | 30 min | " | 3H | " | " | No change for 6 months | Longer than 24 hr | " |
| | N | same as above | 1 | 150 | 30 min | " | 5H | " | " | No change for 6 months | Longer than 24 hr | " |
| | O | Gamma-(2-aminoethyl)-amino-propyltrimethoxysilane | 1 | 150 | 30 min | 100/100 | 4H | No change | No change | No change for 6 months | Longer than 24 hr | No change |
| | P | same as above | 1 | 150 | 30 min | " | 4H | " | " | No change for 6 months | Longer than 24 hr | " |
| | Q | same as above | 1 | 150 | 30 min | " | 4H | " | " | No change for 6 months | Longer than 24 hr | " |
| | R | same as above | 1 | 150 | 30 min | " | 3H | " | " | No change for 6 months | Longer than 24 hr | " |
| | S | same as above | 1 | 150 | 30 min | " | 3H | " | " | No change for 6 months | Longer than 24 hr | Whitening |
| Comparative Example 1 | T | Dibutyltin dilaurate | 2 | 120 | 20 min | 90/100 | H | Peeled | Cracks appeared | No change for 6 months | Longer than 24 hr | Whitening |
| | U | Gamma-(2-aminoethyl)-amino-propyltrimethoxysilane | 1 | 150 | 30 min | 80/100 | 2B | Cracks appeared | Cracks appeared | No change for 6 months | Longer tha 24 hr | No change |
| | V | same as above | 1 | 150 | 30 min | 90/100 | 2B | Cracks appeared | Cracks appeared | No change for 6 months | Longer than 24 hr | " |

Note:
*1: parts by weight based on 100 parts by weight of coating composition.

TABLE 4

| Symbol of coating composition | Example 2 | | | | | | | | |
|---|---|---|---|---|---|---|---|---|---|
| | a | b | c | d | e | f | g | h | i |
| Proportions (parts) of raw materials | | | | | | | | | |
| Type (and parts) of binder component | A (60) | B (60) | C (50) | D (40) | E (60) | F (60) | G (60) | H (60) | I (60) |
| Zirconia silicate (average particle dia.: 0.8 μm) | 35 | 30 | 30 | 40 | 30 | 30 | 30 | 35 | 35 |
| Titanium oxide (average particle dia.: 0.8 μm) | 5 | 5 | 10 | 10 | 10 | 10 | — | — | 5 |
| Silicon dioxide (average particle dia.: 2.3 μmm) | — | 5 | 10 | 10 | — | — | 10 | 5 | — |

| | | | | | | | | Comparative Example 2 | | | | |
|---|---|---|---|---|---|---|---|---|---|---|---|---|
| j | k | l | m | n | o | p | q | r | s | t | u | v |
| J (60) | K (60) | L (60) | M (60) | N (60) | O (60) | P (60) | Q (60) | R (60) | S (60) | T (60) | U (60) | V (60) |
| 35 | 30 | 35 | 35 | 35 | 35 | 30 | 35 | 35 | 35 | 35 | 35 | 35 |
| 5 | 10 | 5 | 5 | 5 | 5 | 10 | 5 | 5 | 5 | 5 | 5 | 5 |
| — | — | — | — | — | — | — | — | — | — | — | — | — |

TABLE 5

| Kind of test piece | Symbol of composition | Hardening accelerator Type | Amount (part)*1 | Hardening conditions Temp. (°C.) | Time | Adhesion | Hardness | Weather resistance | Temperature cycle test | Storage stability | Pot life | Water resistance | Boiling water resistance | Acid resistance | Alkali resistance (2) |
|---|---|---|---|---|---|---|---|---|---|---|---|---|---|---|---|
| Example 2 (1) | a | Gamma-aminopropyl-triethoxysilane | 1 | 120 | 10 min | 100/100 | 5H | No change | No change | No change for 6 months | Longer than 24 hr | No change | No change | No change | No change |
| | b | same as above | 1 | 20 | 12 hr | " | 3H | " | " | No change for 6 months | Longer than 24 hr | " | " | " | " |
| | d | Dibutyltin dilaurate | 5 | 100 | 10 min | " | 3H | " | " | No change for 6 months | Longer than 24 hr | " | " | " | " |
| | f | — | — | 150 | 30 min | " | 4H | " | " | No change for 6 months | Longer than 24 hr | " | " | " | " |
| | g | — | — | 150 | 30 min | " | 3H | " | " | No change for 6 months | Longer than 24 hr | " | " | " | " |
| | h | — | — | 150 | 30 min | " | 3H | " | " | No change for 6 months | Longer than 24 hr | " | " | " | " |
| | j | Gamma-aminopropyl-triethoxysilane | 1 | 150 | 30 min | " | 5H | " | " | No change for 6 months | Longer than 24 hr | " | " | " | " |
| | k | same as above | 1 | 150 | 30 min | " | 5H | " | " | No change for 6 months | Longer than 24 hr | " | " | " | " |
| | l | same as above | 1 | 150 | 30 min | " | 5H | " | " | No change for 6 months | Longer than 24 hr | " | " | " | " |
| | m | same as above | 1 | 150 | 30 min | " | 5H | " | " | No change for 6 months | Longer than 24 hr | " | " | " | " |
| | n | same as above | 1 | 150 | 30 min | " | 5H | " | " | No change for 6 months | Longer than 24 hr | " | " | " | " |
| | o | same as above | 1 | 150 | 30 min | " | 5H | " | " | No change for 6 months | Longer than 24 hr | " | " | " | " |
| | p | Gamma-aminopropyl-triethoxysilane | 1 | 150 | 30 min | 100/100 | 5H | " | " | No change for 6 months | Longer than 24 hr | " | " | " | " |
| | q | same as above | 1 | 150 | 30 min | " | 5H | " | " | No change for 6 months | Longer than 24 hr | " | " | " | " |
| Comparative Example 2 | r | same as above | 1 | 150 | 30 min | " | 5H | " | " | No change for 6 months | Longer than 24 hr | " | Peeled | " | Peeled |
| | s | same as above | 1 | 150 | 30 min | " | 5H | " | " | No change for 6 months | Longer than 24 hr | " | " | " | " |
| | t | Dibutyltin dilaurate | 5 | 150 | 30 min | 90/100 | H | Chalking | " | No change for 6 months | Longer | " | No change | " | No change |

TABLE 5-continued

| Kind of test piece | | Symbol of composition | Hardening accelerator | | Hardening conditions | | Adhesion | Hardness | Weather resistance | Temperature cycle test | Storage stability | Pot life | Water resistance | Boiling water resistance | Acid resistance | Alkali resistance (2) |
|---|---|---|---|---|---|---|---|---|---|---|---|---|---|---|---|---|
| | | | Type | Amount (part)*1 | Temp. (°C.) | Time | | | | | | | | | | |
| | | u | Gamma-aminopropyl-triethoxysilane | 1 | 150 | 30 min | 70/100 | H | appeared | " | No change for 6 months | Longer than 24 hr | " | " | " | " |
| | | v | same as above | 1 | 150 | 30 min | 50/100 | H | No change | " | No change for 6 months | Longer than 24 hr | " | " | " | " |
| (2) Example 2 | | a | — | — | 150 | 30 min | 100/100 | 4H | No change | No change | No change for 6 months | — | No change | No change | No change | No change |
| | | c | — | — | 150 | 30 min | " | 3H | " | " | No change for 6months | — | " | " | " | " |
| | | e | Gamma-aminopropyl-triethoxysilane | 2 | 100 | 10 min | " | 5H | " | " | No change for 6 months | Longer than 24 hr | " | " | " | " |
| | | f | Dibutyltin dilaurate | 5 | 100 | 10 min | " | 5H | " | " | No change for 6months | Longer than 24 hr | " | " | " | " |
| | | h | same as above | 5 | 100 | 10 min | " | 4H | " | " | No change for 6 months | Longer than 24 hr | " | " | " | " |
| | | i | same as above | 5 | 20 | 12 hr | " | 3H | " | " | No change for 6 months | Longer than 24 hr | " | " | " | " |
| | | j | same as above | 5 | 100 | 10 min | " | 5H | " | " | No change for 6 months | Longer than 24 hr | " | " | " | " |
| | | k | same as above | 5 | 100 | 10 min | " | 5H | " | " | No change for 6 months | Longer than 24 hr | " | " | " | " |
| | | l | Gamma-aminopropyl-triethoxysilane | 1.5 | 120 | 10 min | " | 4H | " | " | No change for 6 months | Longer than 24 hr | " | " | " | " |
| | | m | same as above | 1.5 | 120 | 10 min | " | 4H | " | " | No change for 6 months | Longer than 24 hr | " | " | " | " |
| | | n | same as above | 1.5 | 120 | 10 min | " | 5H | " | " | No change for 6 months | Longer than 24 hr | " | " | " | " |
| | | o | Gamma-aminopropyl-triethoxysilane | 1.5 | 120 | 10 min | " | 5H | " | " | No change for 6 months | Longer than 24 hr | " | " | " | " |
| | | p | same as above | 1.5 | 120 | 10 min | " | 5H | " | " | No change for 6 months | Longer than 24 hr | " | " | " | " |
| | | q | same as above | 1.5 | 120 | 10 min | " | 5H | " | " | No change for 6 months | Longer than 24 hr | " | " | " | " |

TABLE 5-continued

| Kind of test piece | Symbol of composition | Hardening accelerator | | Hardening conditions | | Adhesion | Hardness | Weather resistance | Temperature cycle test | Storage stability | Pot life | Water resistance | Boiling water resistance | Acid resistance | Alkali resistance (2) |
|---|---|---|---|---|---|---|---|---|---|---|---|---|---|---|---|
| | | Type | Amount (part)*1 | Temp. (°C.) | Time | | | | | | | | | | |
| Comparative Example 2 | r | same as above | 1.5 | 120 | 10 min | " | 4H | " | " | No change for 6 months | 24 hr | " | Cracks appeared | " | Peeled |
| | s | same as above | 1.5 | 120 | 10 min | " | 3H | " | " | No change for 6 months | Longer than 24 hr | " | Cracks appeared | " | " |
| | t | same as above | 1.5 | 120 | 10 min | 70/100 | H | Chalking appeared | " | No change for 6 months | Longer than 24 hr | " | No change | " | " |
| | u | same as above | 1.5 | 120 | 10 min | 50/100 | B | No change | " | No change for 6 months | Longer than 24 hr | " | " | " | No change |
| | v | same as above | 1.5 | 120 | 10 min | 40/100 | B | " | " | No change for 6 months | Longer than 24 hr | " | " | " | " |

Note:
*¹Parts by weight based on 100 parts by weight of coating composition.

What is claimed is:

1. A coating composition, comprising:
(a) 100 parts by weight, in terms of organoalkoxysilane, of at least one compound selected from the group consisting of (a') an organoalkoxysilane represented by formula (I):

$$RSi(OR^1)_3 \qquad (I)$$

wherein R is an organic group having 1-8 carbon atoms and $R^1$ is an alkyl group having 1-5 carbon atoms or an acyl group having 1-4 carbon atoms, (a'') a hydrolyzate of the organoalkoxysilane (a') and (a''') a partial condensate of the organoalkoxysilane (a'),
(b) 5-50 parts by weight, as solids, of colloidal alumina in which the dispersing medium is water, and
(c) at least one polymer selected from the group consisting of:
  (c₁) 2-200 parts by weight of at least one organopolysiloxane having at least one reactive functional group in the polymer molecule and
  (c₂) 3-6,000 parts by weight of at least one silyl group-containing vinyl polymer having, at the terminal(s) or side chain(s) of the polymer molecule, at least one silyl group having a silicon atom having bonded thereto a hydrolyzable group, and (d) an organic solvent.

2. The coating composition according to claim 1, wherein the total solids content in the composition is 10-50% by weight.

3. The coating composition according to claim 1, wherein the component (a) is a partial condensate (a''') of an organoalkoxysilane (a') represented by the formula (I) and has a polystyrene-reduced weight average molecular weight of 500-50,000.

4. The coating composition according to claim 3, wherein the organoalkoxysilane (a') represented by the formula (I) is at least one member selected from the group consisting of methyltrimethoxysilane, methyltriethoxysilane, methyltriacetoxysilane, methyltripropionyloxysilane, ethyltrimethoxysilane, ethyltriethoxysilane, propyltrimethoxysilane, propyltriethoxysilane, gamma-chloropropyltrimethoxysilane, gamma-chloropropyltriethoxysilane, vinyltrimethoxysilane, vinyltriethoxysilane, 3,3,3-trifluoropropyltrimethoxysilane, 3,3,3-trifluoropropyltriethoxysilane, gamma-glycidoxypropyltrimethoxysilane, gamma-glycidoxypropyltriethoxysilane, gamma-methacryloyloxypropyltrimethoxysilane, gamma-methacryloyloxypropyltriethoxysilane, gamma-mercaptopropyltrimethoxysilane, gamma-mercaptopropyltriethoxysilane, phenyltrimethoxysilane, phenyltriethoxysilane, 3,4-epoxycyclohexylethyltrimethoxysilane and 3,4-epoxycyclohexylethyltriethoxysilane.

5. The coating composition according to claim 1, wherein the amount of the component (b) is 8-40 parts by weight, as solids.

6. The coating composition according to claim 1, wherein the amount of the component (c₁) is 5-50 parts by weight.

7. The coating composition according to claim 1, wherein the component (c₁) is an organopolysiloxane having a unit structure represented by the formula (III):

$$R^3{}_aSiO_{(4-a)/2} \qquad (III)$$

wherein $R^3$ is an organic group having 1-8 carbon atoms and a is a positive number of 1.1-1.8 and having in the molecule at least one reactive functional group —OX' bonded to the silicon atom, wherein X' is a hydrogen atom or an alkyl group having 1-5 carbon atoms.

8. The coating composition according to claim 1, wherein the silyl group of the component (c₂) is a silyl group represented by the formula (IV):

$$\begin{array}{c}(R^4)_{3-n}\\|\\-Si-X_n\end{array} \qquad (IV)$$

wherein X is a halogen atom, a hydroxyl group, an alkoxy group, an acyloxy group, a phenoxy group, a thioalkoxy group or an amino group, $R^4$ is a hydrogen atom, a $C_{1-10}$ alkyl group or a $C_{7-10}$ aralkyl group, and n is an integer of 1-3.

9. The coating composition according to claim 8, wherein the component (c₂) is (i) a reaction product of a hydrosilane compound with a vinyl resin having carbon to carbon double bonds, or (ii) a polymerization product of a vinyl compound with a silane compound represented by the formula (V):

$$\begin{array}{c}(R^4)_{3-n}\\|\\R^5-Si-X_n\end{array} \qquad (V)$$

wherein $R^4$ is a hydrogen atom, a $C_{1-10}$ alkyl group or a $C_{7-10}$ aralkyl group, X is a halogen atom, an alkoxy group, an acyloxy group, a hydroxyl group, a phenoxy group, a thioalkoxy group or an amino group, $R^5$ is an organic group having a polymerizable double bond, and n is an integer of 1-3.

10. The coating composition according to claim 1, wherein the amount of the component (c₂) is 10-3,000 parts by weight.

11. The coating composition according to claim 1, wherein the component (d) is at least one member selected from the group consisting of alcohols, aromatic hydrocarbons, ethers, ketones and esters.

12. The coating composition according to claim 1, which further comprises a hardening accelerator.

13. The coating composition according to claim 12, wherein the amount of the hardening accelerator is not more than 15 parts by weight per 100 parts by weight of the composition.

14. The coating composition according to claim 1, wherein the hardness of the cured product is 2H or more.

15. The coating composition according to claim 1, wherein the proportion of component (d) is 10-200 parts by weight.

* * * * *